US012634559B2

(12) United States Patent (10) Patent No.: US 12,634,559 B2
Niebres et al. (45) Date of Patent: *May 19, 2026

(54) USER DEVICE PAN AND SCAN

(71) Applicant: Comcast Cable Communications, LLC, Philadelphia, PA (US)

(72) Inventors: Francisco Niebres, San Francisco, CA (US); Tyler Kareeson, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/917,970

(22) Filed: Oct. 16, 2024

(65) Prior Publication Data

US 2025/0039509 A1 Jan. 30, 2025

Related U.S. Application Data

(63) Continuation of application No. 15/858,159, filed on Dec. 29, 2017, now Pat. No. 12,149,794.

(51) Int. Cl.
| | |
|---|---|
| *H04N 21/47* | (2011.01) |
| *H04N 21/422* | (2011.01) |
| *H04N 21/472* | (2011.01) |
| *H04N 21/485* | (2011.01) |
| *H04N 21/8547* | (2011.01) |
| *H04N 21/45* | (2011.01) |

(52) U.S. Cl.
CPC . *H04N 21/47217* (2013.01); *H04N 21/42202* (2013.01); *H04N 21/4854* (2013.01); *H04N 21/8547* (2013.01)

(58) Field of Classification Search
USPC .......................................................... 386/248
See application file for complete search history.

(56) References Cited

U.S. PATENT DOCUMENTS

| | | | |
|---|---|---|---|
| 9,436,767 B2 * | 9/2016 | Gordon ..................... | G06F 3/14 |
| 10,205,884 B2 | 2/2019 | Song et al. | |
| 2005/0289111 A1 | 12/2005 | Tribble et al. | |
| 2006/0010100 A1 | 1/2006 | McAvoy et al. | |
| 2010/0088639 A1 | 4/2010 | Yach et al. | |
| 2012/0140092 A1 | 6/2012 | Nourbakhsh et al. | |
| 2012/0287315 A1 | 11/2012 | Huang et al. | |
| 2013/0108165 A1 * | 5/2013 | Ptucha .................... | G06T 11/60 |
| | | | 382/195 |
| 2013/0108166 A1 * | 5/2013 | Ptucha .................... | G06T 11/60 |
| | | | 382/195 |
| 2013/0108175 A1 | 5/2013 | Ptucha | |
| 2013/0239049 A1 | 9/2013 | Perrodin et al. | |
| 2013/0321398 A1 | 12/2013 | Howard et al. | |
| 2013/0321402 A1 | 12/2013 | Moore et al. | |
| 2013/0325319 A1 | 12/2013 | Moore et al. | |

(Continued)

*Primary Examiner* — Nigar Chowdhury
(74) *Attorney, Agent, or Firm* — BakerHostetler

(57) ABSTRACT

Systems and methods are disclosed for controlling video playback. An image may be received that is configured for display by the user device. A display map may be received indicating display parameters for configuring the display of the image based on an orientation of the user device. At least a portion of the image may be caused to be displayed by the user device based at least on the display map and a determined orientation of the user device.

48 Claims, 8 Drawing Sheets

400

500

(56)  References Cited

U.S. PATENT DOCUMENTS

| | | | |
|---|---|---|---|
| 2013/0325322 A1 | 12/2013 | Blumenberg | |
| 2013/0326380 A1 | 12/2013 | Lai et al. | |
| 2014/0365120 A1 | 12/2014 | Vulcano et al. | |
| 2015/0049080 A1 | 2/2015 | Purayil et al. | |
| 2015/0062178 A1 | 3/2015 | Matas et al. | |
| 2015/0213580 A1 | 7/2015 | Yamano et al. | |
| 2016/0027399 A1 | 1/2016 | Wilde et al. | |
| 2016/0044385 A1 | 2/2016 | Kareeson et al. | |
| 2016/0188282 A1 | 6/2016 | Tang et al. | |
| 2016/0219248 A1 | 7/2016 | Reznik et al. | |
| 2016/0259413 A1 | 9/2016 | Anzures et al. | |
| 2016/0261915 A1 | 9/2016 | Niebres et al. | |
| 2016/0292132 A1* | 10/2016 | Briggs | G06F 40/106 |
| 2016/0300266 A1 | 10/2016 | Smalley et al. | |
| 2016/0366330 A1 | 12/2016 | Boliek et al. | |
| 2017/0052605 A1* | 2/2017 | Varaschin de Moraes | G06F 1/1694 |
| 2017/0064282 A1 | 3/2017 | Lo | |
| 2017/0132810 A1 | 5/2017 | Gilra et al. | |
| 2017/0187983 A1 | 6/2017 | Lawrence | |
| 2018/0070389 A1 | 3/2018 | Morgan | |
| 2018/0152630 A1 | 5/2018 | Demoulin et al. | |
| 2018/0323988 A1 | 11/2018 | Beel et al. | |
| 2019/0208281 A1 | 7/2019 | Niebres et al. | |

* cited by examiner

300

400

500

400

500

702 Receive or access an image by a user device

704 Receive or access a display map

706 Determine orientation of the user device

708 Cause at least a portion of the image to be displayed

802 Receive or access an image by a user device

804 Receive or access display parameters

806 Determine orientation of the user device

808 Cause at least a portion of the image to be displayed

902 Receive or access video

904 Receive or access boundary information

906 Map the boundary information to a device parameter

908 Generate display information

910 Transmit the video and the display information

USER DEVICE PAN AND SCAN

CROSS-REFERENCE TO RELATED APPLICATIONS

This application is a continuation of U.S. application Ser. No. 15/858,159 filed Dec. 29, 2017, which is incorporated herein by reference in its entirety.

BACKGROUND

User devices, such as mobile telephones, e-book readers, tablet computers and the like typically have rectangular display screens that may be viewed in a "portrait" orientation or a "landscape" orientation. Typically, the user device is equipped with hardware (e.g., inertial sensor) or software to determine a physical orientation of display screen. As such, the user device may adjust the images presented by the display screen to accommodate for the particular aspect ratio of the physical orientation of the display screen.

However, in certain scenarios, it may be desirable to maintain a particular display orientation as the user device is rotated. In other scenarios, a video may be configured to be presented in landscape, but the display screen may be oriented for portrait viewing. As such, the user device may adjust a position of the video so that it may be viewed in a landscape video format on the portrait oriented display screen. Viewing the landscape video in this way may result in large block boxes presented at the top and bottom of the display screen, while the landscape video is only occupying a small portion of the display screen. Alternatively, the user device may adjust a zoom of the video such that only a portion of the images in the video frames are displayed, but the displayed images cover the entire display screen. But, certain portions of the video will not be rendered to the user and may negatively affect the overall user experience. Therefore, improvements in image processing such as a pan and scan image processing are needed.

SUMMARY

Systems and methods are disclosed for controlling video playback. The capture and transmission of video or individual images may comprise metadata defining a timecode and boundary parameters for at least a portion of the video. For example, such metadata may be based on particular configurations set by a source of the video. Such sources may comprise a user capturing video, a director, an editor, or a third party such as a video studio. The metadata may comprise multiple orientations and/or screen sizes, and may facilitate discrete control over the viewable portion of the video based on at least an aspect of a scene (frame) in the video, an aspect ratio of the display device, and an orientation of the display device. Customization of the metadata allows a source of the video, whether original source or intervening source, to identify specific portions of a video for customized pan and scan, when viewed.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

The systems and methods may comprise receiving content such as an image configured for display by a user device. A display map may be received and may indicate display parameters for configuring the display of the image based on an orientation of the user device. The display map may comprise a plurality of mapped groups, each of the mapped groups corresponding to a particular orientation of the user device and an associated set of display parameters. The display parameters may comprise one or more of an image boundary, an aspect ratio, and a transition. The display parameters may comprise a first image boundary associated with a portrait orientation of the user device and a second image boundary associated with a landscape orientation of the user device. The orientation may be represented by various coordinates or relative positions such as portrait, landscape, or various stepped angles transitioning between portrait and landscape. As such, at least a portion of the image may be caused to be displayed by the user device based at least on the display map and a determined orientation of the user device.

Metadata, for example, the display map may be embedded in the video or comprised in a manifest or sidecar file that the recipient device may check against based on the current orientation of the recipient device. If the recipient device is in a specific orientation, and if the metadata comprises the boundary parameters for video to render for that orientation, then the recipient device may crop the incoming video based on the boundary parameters, which results in display of a specific portion of the overall video scenes.

In the (Internet Protocol) IP video context, a recipient device may generate a request (e.g., an HTTP request) to a video streaming device. The request may comprise attributes associated with the recipient device such as screen dimensions and aspect ratio of the recipient device. In response to the request, the video streaming device may determine metadata based on the attributes associated with the recipient device, crop the video based on the boundary parameters in the metadata, and transmit (e.g., stream) the cropped video to the recipient device.

Figure 1:
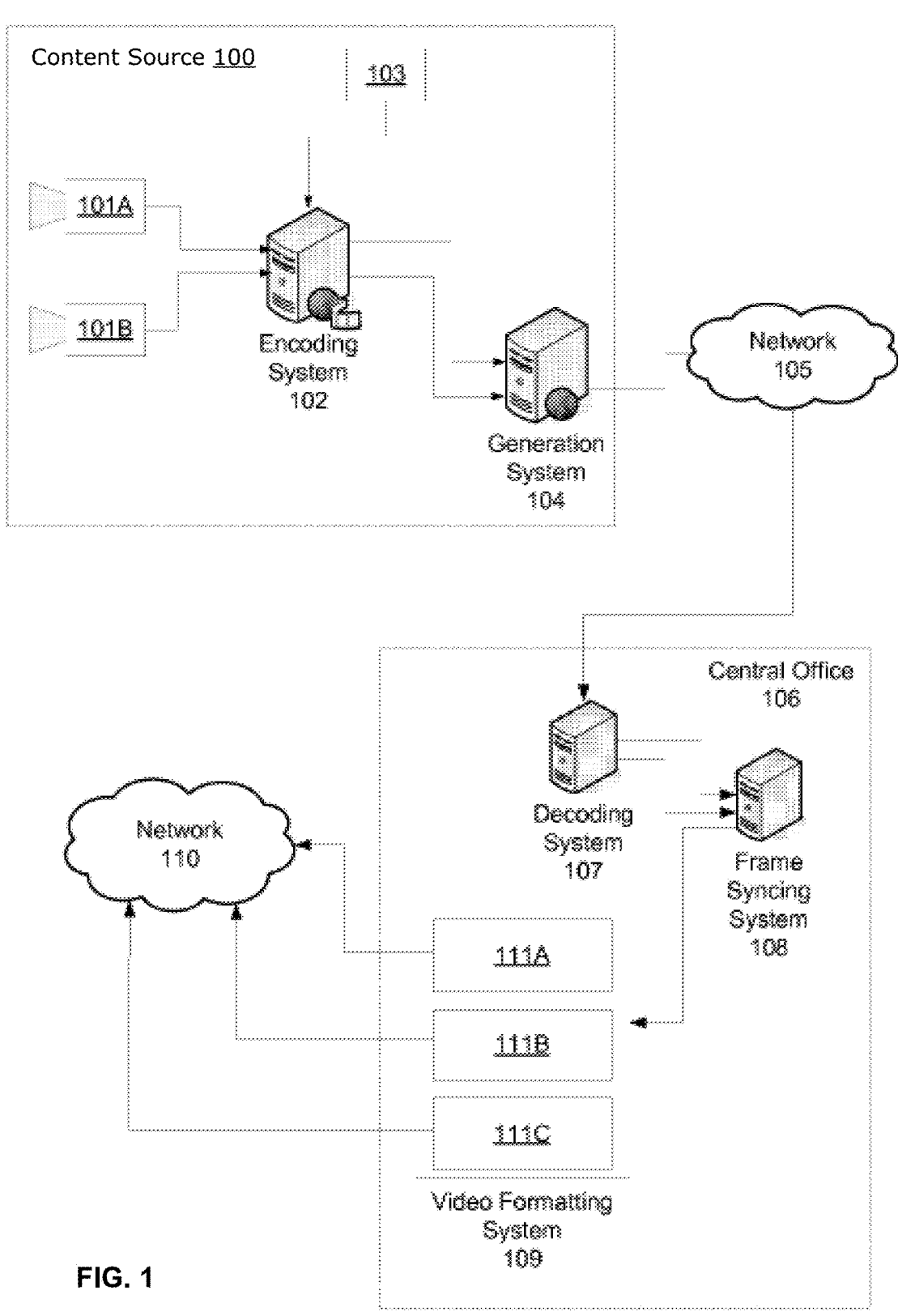
FIG. 1 is a block diagram of an example system and network.

FIG. 1 shows an example system and network in accordance with one or more aspects of the present disclosure. Aspects of the network allow for transmission (e.g., streaming) of video content over a network, such as the Internet. One or more aspects of the network are adapted to deliver content to Internet (or another public or local network) connected display devices.

The video content may be created and/or offered by one or more content sources 100. The sources 100 may capture video content using one or more cameras 101A and 101B. The cameras 101A and/or 101B may be any of a number of cameras that are configured to capture video content. The cameras 101A and/or 101B may be integrated with other devices such as user devices 202 (FIG. 2), as will be described in further detail below.

The data output from the cameras 101A and/or 101B may be sent to an encoding (e.g., stereographer/production/video processing) system 102 for processing of the data. Such initial processing may comprise any of a number of processing of such video data, for example, cropping of the captured data, color enhancements to the captured data, and association of audio to the captured video content.

The data output from the cameras 101A and/or 101B may be associated with metadata (e.g., display parameters) defining at least a timecode and boundary parameters for at least a portion of the video. For example, such metadata may be based on particular configurations set by a source of the video. Such sources may comprise a user capturing video, a director, an editor, or a third party such as a video studio. The metadata may comprise multiple orientations and/or screen sizes, and may facilitate discrete control over the viewable portion of the video based on at least an aspect of a scene (frame) in the video, an aspect ratio of the display device, and an orientation of the display device. Customization of the metadata allows a source of the video, whether original source or intervening source, to identify specific portions of a video for customized pan and scan, when viewed.

The metadata may comprise display information such as a display map including a plurality of mapped groups. Each of the mapped groups may correspond to a particular orientation of the user device and an associated set of display parameters. For example, the display map may comprise mapped groups similar to the information in Table 1:

TABLE 1

| Orien-tation | Device Param-eters | Timecode | Boundary Parameters | Transition |
|---|---|---|---|---|
| Portrait | Aspect 16:9 | $HH_1:MM_1:SS_1$ | $(X_0, Y_0)(X_1, Y_1)$ | (pan, inherit) |
| Landscape | Aspect 16:9 | $HH_1:MM_1:SS_1$ | $(X_2, Y_2)(X_3, Y_3)$ | (pan, inherit) |
| Portrait | Aspect 4:3 | $HH_1:MM_1:SS_1$ | $(X_0, Y_0)(X_1, Y_1)$ | (snapzoom, dissolve) |
| Landscape | Aspect 4:3 | $HH_1:MM_1:SS_1$ | $(X_2, Y_2)(X_3, Y_3)$ | (snapzoom, dissolve) |

As shown in Table 1, display information may comprise orientation, device parameters, timecodes (in/out), image boundary parameters, image transitions (in/out), and the like. The organization of the information in Table 1 is for example only. It is understood that other formats, categories, groupings, and the like may be used.

Orientation may comprise binary information such as portrait or landscape. Orientation may comprise any representation of viewing perspective. Orientation may comprise a viewing perspective offset from a portrait or a landscape perspective, such as by an angle or by stepped angles transitioning between portrait and landscape or landscape and portrait or positions therebetween.

As an example, a vertical axis may be defined such that an imaginary line passing through the length (e.g., longitudinal axis) of a display is parallel to the vertical axis when the display is in a portrait orientation. The orientation may comprise an angle between the vertical axis and the imaginary line. For example, the orientation may comprise an angle between 0 to 90 degrees, wherein 0 degrees corresponds to a portrait orientation and 90 degrees corresponds to a landscape orientation. The display information may be mapped to various angular steps (e.g., 1 degree steps, 5 degree steps, 15 degree steps, etc.). As such, when the display device is rotated through the angular steps, the mapped display information may be determined and applied to the corresponding angle of the display device. Such application of the display information may result in pan, tilt, or zoom, to specified bounded regions of the available content. Image processing may be used to translate between the stepped application of the display information.

The orientation may account for the viewing perspective with respect to a top and a bottom of a user device or a display screen. For example, the orientation may comprise an angle between 0 to 360 degrees. 0 degrees may correspond to a portrait orientation wherein the top of the user device is above the bottom of the user device relative to the surface of the Earth. Any angle including or between 1 to 360 degrees may correspond to an orientation representing a clockwise rotation of the user device relative the portrait orientation.

The orientation may comprise a plurality of orientations, such as to represent a plurality of perspectives. The orientation may comprise a range of orientations, such as to represent a transition between perspectives. The orientation may comprise an initial orientation and a final orientation, such as to represent a change in perspectives from the initial orientation to the final orientation.

Device parameters may comprise aspect ratio, display screen size, color capability, and/or other parameters relating to a viewing device. The timecodes may comprise timing information associated with a particular point in a video, for example. The timecode may comprise a range of timecodes, such as a start time and an end time of a scene. The timecodes may indicate a timecode associated with a display parameter to be applied at a particular time in the video. The timecodes may indicate a timecode associated with a display parameter to be transitioned out or changed. Other times may be represented by the timecodes.

Boundary parameters may comprise information relating to a portion of an image in a video. For example, the boundary parameters may indicate a two dimensional area that is equal to or less than the full image represented by the data captured by the cameras 101A and/or 101B. The boundary parameters may comprise coordinates or vertices of the two dimensional area. As a further example, the boundary parameters may relate to an image of the video associated with a particular timecode. If the orientation comprises a plurality of orientations, the boundary parameters may comprise a plurality of boundary parameters corresponding to the plurality of orientations. For example, if the orientation comprises a range of orientations representing a transition in perspectives, the boundary parameters may comprise a specific boundary parameter for each angle of orientation within the range of orientations.

Transition information may comprise information relating to a display transition from an image prior to a designated timecode to the bounded image associated with the boundary parameters. The transition information may comprise information relating to a display transition from an image subsequent to a designated timecode to the bounded image associated with the boundary parameters. The transition information may be associated with a transition in and/or a transition out relative the bounded image or images. For example, the transition information may comprise instructions to pan, inherit, zoom, dissolve, or blur one or more bounded images. The transition information may be associated with a change in orientation. For example, the transition information may comprise instructions to blend bounded images during a change in orientation, such as through one or more angles relative an axis.

Metadata, such as a display map, may be generated by a computing device. The metadata may be customized by a computing device. For example, a computing device may be programmed to generate the metadata based on particular configurations set for a video. The computing device may be programmed to build upon the metadata, such as in response to receiving new data or new display parameters.

The computing device may generate the metadata using a machine learning technique. For example, the computing device may receive a sample input, such as particular configurations for one or more videos or sample metadata. Sample metadata may comprise a sample display map or sample display parameters. The sample input may comprise a learning data set or a training data set, from which the computing device may construct an algorithm or update an existing algorithm to generate the metadata.

The computing device may receive a sample display map comprising a plurality of mapped groups. The computing device may train an algorithm based on the sample display map to determine display parameters for groups that are not comprised in the sample display map. For example, the sample display map may comprise a plurality of mapped groups corresponding to particular device parameters. The computing device may construct an algorithm to determine display parameters, such as boundary parameters, for device parameters that are not comprised in the sample display map.

As another example, the computing device may receive a sample display map comprising a plurality of mapped groups corresponding to portrait or landscape orientations. The computing device may construct an algorithm to determine display parameters for an orientation that is not landscape or portrait, such as an orientation offset from a landscape or portrait perspective by an angle. The algorithm may be constructed to determine display parameters comprising boundary parameters mapped to particular device parameters for the orientation that is not landscape or portrait.

As another example, the computing device may receive a sample input comprising a sample mapped group. The computing device may construct an algorithm to determine a plurality of mapped groups from the sample mapped group. As an example, the computing device may receive a sample mapped group comprising boundary parameters ($X_a$, $Y_a$)($X_b$, $Y_b$) for a timecode $HH_c$:$MM_c$:$SS_c$ corresponding to a portrait orientation for device parameters of a 16:9 aspect ratio. The computing device may construct an algorithm to determine boundary parameters for the timecode $HH_c$:$MM_c$:$SS_c$ corresponding to a plurality of orientations for a plurality of device parameters.

The display information may comprise parameters associated with virtual reality content ("VR content"). VR content may comprise interactive video content. VR content may comprise 360 degree video content. VR content may may comprise one or more view angles. Parameters may comprise frames associated with the one or more view angles. Parameters may comprise boundary parameters associated with the frames or the one or more view angles. Parameters may comprise transition information, such as information related to blending frames when changing view angles.

An optional audio recording system 103 may capture audio associated with the video signal from the cameras 101A and 101B and generate a corresponding audio signal. Alternatively, cameras 101A/B may be adopted to capture audio. The audio captured may, for example, comprise spoken words in an audio track that accompanies the video stream and/or other audio associated with noises and/or other sounds. Audio recording system 103 may generate an audio signal that may be inserted, for example, at corresponding time sequences to the captured video signals in the encoding system 102.

The audio track may be directly associated with the images captured in the video signal. For example, cameras 101A and/or 101B may capture and generate data of a video signal with an individual talking and the audio directly associated with the captured video may be spoken words by the individual talking in the video signal. Alternatively and/or concurrently, the audio track also may be indirectly associated with the video stream. In such an example, the cameras 101A and/or 101B may capture and generate data of a video signal for a news event and the audio indirectly associated with the captured video may be spoken words by a reporter not actually shown in the captured video.

The stream generation system 104 may be configured to transmit at least two independent signals of captured and/or processed video data from cameras 101A and 101B. The data may be compressed in accordance with a particular protocol and/or for transmission of the signals across a particular type of infrastructure for data transmission. For example, compression of the video may allow for transmission of the captured video signals across a greater distance while using less bandwidth in comparison to no compression of the captured video signals. The audio signal added by the audio recording system 103 also may be multiplexed with one or both of the two video signals. As noted above, the generated signals may be in a digital format, such as an Internet Protocol (IP) encapsulated format. By transmitting each video signal for respective eyes of a viewer as two separate/independent signals, data integrity is better maintained and fewer resources are used. Independent or separate video signals, for example, have not been frame synced to the other between a video image and/or audio capturing location, e.g., an on-site location, and a central processing point in the infrastructure of a service provider, e.g., an off-site location.

The single or multiple encapsulated IP streams may be sent via a network 105 to any desired location. Any number of IP streams may be sent via the network 105 to a desired location, such as central office 106. The network 105 may be any type of communication network, such as satellite, fiber optic, coaxial cable, cellular telephone, wireless (e.g., WiMAX), twisted pair telephone, etc., or any combination thereof. In some embodiments, a service provider's central office 106 may make the content available to users. Information transmitted from the central office 106 may comprise the metadata such as the display information described herein. The metadata may be encapsulated in an IP stream with the underlying video or may be transmitted as a separate file (e.g., sidecar file).

The central office 106 may comprise, for example, a decoding system 107 including one or more decoders for decoding received video and/or audio signals. Decoding system 107 may be configured to receive the two encoded video signals independently. Decoding system 107 may further be configured to decompress the received video signals, if needed, and may be configured to decode the two signals as the first and second video signals corresponding to the video signal captured for the left eye of a viewer and the video signal captured for the right eye of the viewer.

In the case of an audio signal being transmitted with the associated video signals, decoding system 107 further may be configured to decode the audio signal. In one example, an audio signal corresponding to audio captured with associated video content may be received as part of one of the two video signals received from a stream generation system 104. In such an example, one of the video signals may be for the right eye of a viewer and the other video signal may be for the left eye. The audio signal may be received as an encoded combined signal with the left and/or right eye signal.

Figure 2:
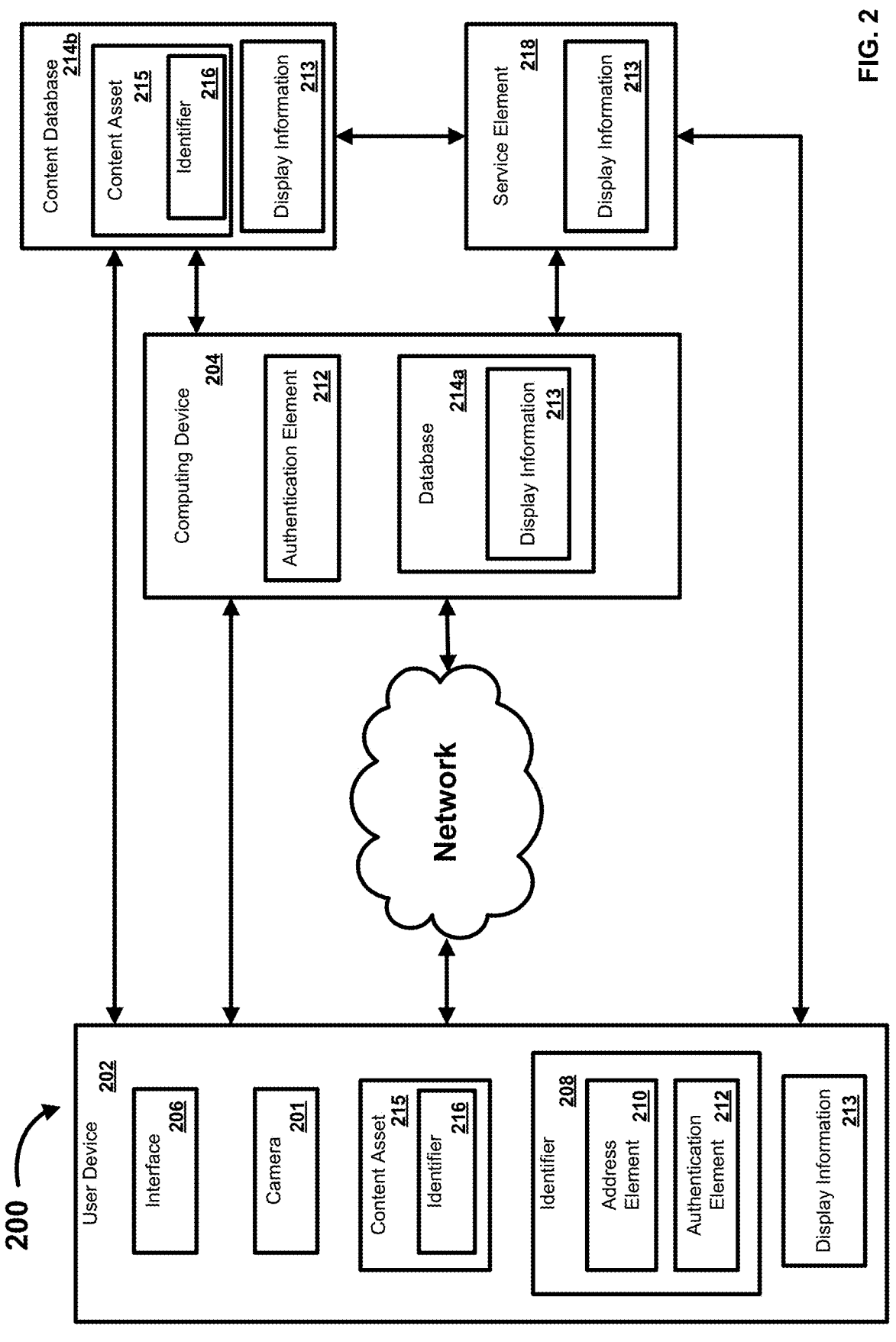
FIG. 2 is a block diagram of an example system and network.

Operatively connected to decoding system 107 may be a frame syncing system 108, which may be combined as a computing device 204 as depicted in FIG. 2 (discussed below). Frame syncing system 108 may be configured to compare time codes for each frame of video content in the first video signal with those for each frame of video content in the second signal. In the example of an audio signal comprised with one or both of the video signals as a combined signal, upon decoding of the audio signal by a decoding system 107, frame syncing system 108 may be configured to sync the audio signal with the frame synced video signal. The process of syncing the audio signal with the frame syncing system 108 may comprise identifying a time sequence of the frame synced video signal to insert the corresponding audio signal.

Operatively connected to frame syncing system 108 may be a video formatting system 109. Video formatting system 109 may be configured to receive a frame synced video signal from the frame syncing system 108. The frame synced video signal comprises a first video signal corresponding to a first video feed for one eye of a viewer and a second video signal corresponding to a second video feed for the other eye of the viewer. Video formatting system 109 may compress the frame synced video signal into a plurality of compressed frame synced video signals. Each compressed frame synced video signal may be compressed according to a different format, e.g., for different transmission systems and/or different user devices.

In the example of FIG. 1, video formatting system 109 may comprise one of a plurality of different compression format devices for compressing a frame synced video signal before transmission across a network 110. The different compression format devices may be or comprise, for example, H.264 component 111A, MPEG2 component 111B, and Windows Media 9 component 111C. Video may be multicast to multiple encoding and distribution platforms using IP technology. Video is multicast using IP to multiple video compression platforms. Previous technologies would have used an SDI router to deliver the video to multiple compression platforms. By using IP multicast, it is possible to feed the video to multiple compression and transport platforms. The present disclosure is not limited to three video CODECs. Using aspects of the present disclosure, it is possible to add any number of CODECs. Others comprise Flash, On2, MPEG-1, Smooth, and Zeri. Additional and/or alternative format devices or systems may be comprised as desired or required.

Component 111A may be configured to compress the frame synced video signal to H.264 format, for example, which may be a format often utilized for set-top boxes of users of service providers. Component 111B may be configured to compress the frame synced video signal to MPEG2 format, for example, which may be a format often utilized for home computers of users, e.g., subscribers, of service providers. Component 111C may be configured to compress the frame synced video signal to Windows Media 9 format, for example, which may be a format often utilized for streaming video to users. Although FIG. 1 shows H.264 component, MPEG2 component and Windows Media 9 component as three illustrative compression format devices, the disclosure is not so limited and may comprise any format of compression of video and number of components. The present disclosure should not be interpreted as being limited to the examples provided herein.

Video formatting system 109 may be connected to network 110, which may be any type of communication network, such as satellite, fiber optic, coaxial cable, cellular telephone, wireless (e.g., WiMAX), twisted pair telephone, etc., or any combination thereof. Video formatting system 109 may be configured to transmit the compressed frame synced video signals from components 111A, 111B, and 111C over the network 110. As such, a frame synced video signal according to any particularly desired compression format may be transmitted to any desired location. In some embodiments, network 110 may be operatively connected to, may incorporate one or more components, or may be network 105.

In some examples, a home of a user may be configured to receive data from network 110. The home of the user may comprise a home network configured to receive encapsulated 3D video content and distribute such to one or more viewing devices, such as televisions, computers, mobile video devices, 3D headsets, etc. In other examples, a computer may be configured to receive data from network 110 as streaming video.

FIG. 2 shows various aspects of an exemplary system and network in which the present methods and systems may operate. The present disclosure relates to systems and methods for managing data. Those skilled in the art will appreciate that present methods may be used in systems that employ both digital and analog equipment. One skilled in the art will appreciate that provided herein is a functional description and that the respective functions may be performed by software, hardware, or a combination of software and hardware.

The system and network 200 may comprise a user device 202 in communication with a computing device 204 such as a server, for example. The computing device 204 may be disposed locally or remotely relative to the user device 202. As an example, the user device 202 and the computing device 204 may be in communication via a private or public network such as the Internet. Other forms of communication may be used, such as wired and wireless telecommunication channels, for example.

The user device 202 may be an electronic device, such as a computer, a smartphone, a laptop, a tablet, a set top box, or other device capable of communicating with the computing device 204. The user device 202 may comprise a camera 201 (e.g., camera 101A, 101B (FIG. 1).

The user device 202 may comprise an interface 206 for providing an interface to a user to interact with the user device 202 and/or the computing device 204. The interface 206 may be any interface for presenting information to the user and receiving a user feedback such as a web interface (e.g., Internet Explorer, Mozilla Firefox, Google Chrome, Safari, or the like). Other software, hardware, and/or interfaces may be used to provide communication between the user and one or more of the user device 202 and the computing device 204. As an example, the interface 206 may request or query various files from a local source and/or a remote source.

As an example, the interface 206 may facilitate interaction between a user and one or more of the user device 202 and/or the computing device 204. As a further example, the interface 206 may provide feedback to the user. In an aspect, the interface 206 may receive an input, allowing the users to manipulate control functions associated with the one or more of the user device 202 and/or the computing device 204. As an example, the interface 206 may provide an output, allowing the one or more of the user device 202 and/or the computing device 204 to indicate the effects of the received input. As a further example, the interface 206 may present content such as program guide listings, content options, and related information.

The interface 206 may obtain program guide listings from an electronic program listing database and display the program guide listings. The interface 206 may display program guide information for programs that are available for viewing on the mobile terminal at that time. The interface 206 may display program guide information listings for multiple programs one after another and may display each program guide listing for a predetermined time range. A user may specify and store personal interest rules for the interface 206 to alert the user when the interface 206 is displaying information for a certain program, or for a certain genre of program.

An interface such as interface 206 may provide interface elements (e.g., icons, selectable items, option items, graphical representations, etc.). Such interface elements may be associated with a video player such as dedicated software, plug-in, or browser based player configured to receive video data and to cause presentation of a video via a display of the user device 202 or display associated with the user device 202.

The user device 202 may comprise an identifier 208, which, among other things, may be used to: authenticate the user device 202 with a particular network; install drivers; configure a modem; set up a wired or wireless Local Area Network (LAN); secure an operating system; configure browser provider-specifics; provision electronic mail (e.g. create mailboxes and aliases); configure electronic communications; install additional support software; install add-on packages; and the like. As an example, the identifier 208 may comprise one or more address elements 210 and authentication elements 212.

The address element 210 may be a uniform resource identifier (URI) (e.g., a uniform resource locator (URL)), a network address, an Internet address, or the like. As an example, the address element 210 may be relied upon to establish a communication session between the user device 202 and the computing device 204. As a further example, the address element 210 may be any identifier used to distinguish the user device 202 from other devices intercommunicating with the computing device.

The authentication element 212 may be credentials, a token, a character, a string, or the like, for differentiating one user or user device from another user or user device. The authentication element 212 may comprise information for authenticating the user and/or user device 202 with the computing device 204 to facilitate access to data and/or services. As an example, the computing device 204 may be configured to receive and validate the authentication element 212 to facilitate a secure communication between the user device 202 and one or more of the computing devices, such as computing device 204.

Display information 213 may be processed by one or more of the user device 202 and the computing device 204 to control a display of video. For example, the display information 213 may be based on particular configurations set by a source of the video. Such sources may comprise a user capturing video, a director, an editor, or a third party such as a video studio. The display information 213 may comprise multiple orientations and/or screen sizes, and may facilitate discrete control over the viewable portion of the video based on at least an aspect of a scene (frame) in the video, an aspect ratio of the display device, and an orientation of the display device. Customization of the display information 213 allows a source of the video, whether original source or intervening source, to identify specific portions of a video for customized pan and scan, when viewed.

The display information 213 may comprise a display map including a plurality of mapped groups. Each of the mapped groups may correspond to a particular orientation of the user device and an associated set of display parameters. For example, the display map may comprise a mapped groups similar to the information in Table 2:

TABLE 2

| Orientation | Device Parameters | Timecode | Boundary Parameters | Transition |
|---|---|---|---|---|
| Portrait | Aspect 4:3 | $HH_1:MM_1:SS_1$ | $(X_0, Y_0)(X_1, Y_1)$ | (pan, inherit) |
| Landscape | Aspect 4:3 | $HH_1:MM_1:SS_1$ | $(X_2, Y_2)(X_3, Y_3)$ | (pan, inherit) |
| Portrait | Aspect 3:2 | $HH_1:MM_1:SS_1$ | $(X_0, Y_0)(X_1, Y_1)$ | (pan, dissolve) |
| Landscape | Aspect 3:2 | $HH_1:MM_1:SS_1$ | $(X_2, Y_2)(X_3, Y_3)$ | (pan, dissolve) |

As shown in Table 2, display information may comprise orientation, device parameters, timecodes (in/out), image boundary parameters, image transitions (in/out), and the like. The organization of the information in Table 2 is for example only. It is understood that other formats, categories, groupings, and the like may be used.

Orientation may comprise binary information such as portrait or landscape. Orientation may comprise any representation of viewing perspective. Orientation may comprise a viewing perspective offset from a portrait or a landscape perspective, such as by an angle. The orientation may represent a position of a display or a device relative to an axis, such as an axis normal to the surface of the Earth or an axis along a plumb line. The orientation may be defined as a deviation from the axis. The deviation may be represented as an angle or a unit of length.

The orientation may account for the viewing perspective with respect to a top and a bottom of a user device or a display screen. For example, the orientation may comprise an angle between 0 to 360 degrees. 0 degrees may correspond to a portrait orientation wherein the top of the user device is above the bottom of the user device relative to the surface of the Earth. Any angle including or between 1 to 360 degrees may correspond to an orientation representing a clockwise rotation of the user device relative the portrait orientation.

The orientation may comprise a plurality of orientations, such as to represent a plurality of perspectives. The orientation may comprise a range of orientations, such as to represent a transition between perspectives. The orientation may comprise an initial orientation and a final orientation, such as to represent a change in perspectives from the initial orientation to the final orientation.

Device parameters may comprise aspect ratio, display screen size, color capability, and/or other parameters relating to a viewing device. The timecodes may comprise timing information associated with a particular point in a video, for example. The timecode may comprise a range of timecodes, such as a start time and an end time of a scene. The timecodes may indicate a timecode associated with a display parameter to be applied at a particular time in the video. The timecodes may indicate a timecode associated with a display parameter to be transitioned out or changed. Other times may be represented by the timecodes.

Boundary parameters may comprise information relating to a portion of an image in a video. For example, the boundary parameters may indicate a two dimensional area that is equal to or less than the full image. The boundary parameters may comprise coordinates or vertices of the two dimensional area. As a further example, the boundary parameters may relate to an image of the video associated with a particular timecode. If the orientation comprises a plurality of orientations, the boundary parameters may comprise a plurality of boundary parameters corresponding to the plurality of orientations. For example, if the orientation comprises a range of orientations representing a transition in perspectives, the boundary parameters may comprise a specific boundary parameter for each angle of orientation within the range of orientations.

Transition information may comprise information relating to a display transition from an image prior to a designated timecode to the bounded image associated with the boundary parameters. The transition information may comprise information relating to a display transition from an image subsequent to a designated timecode to the bounded image associated with the boundary parameters. The transition information may be associated with a transition in and/or a transition out relative the bounded image or images. For example, the transition information may comprise instructions to pan, inherit, zoom, dissolve, or blur one or more bounded images. The transition information may be associated with a change in orientation. For example, the transition information may comprise instructions to blend bounded images during a change in orientation, such as through one or more angles relative an axis.

The display information 213 may be stored in one or more databases 214a, 214b and may be transmitted to the user device 202 to control the playback of video on the user device 202. The display information 213 may be transmitted to the user device 202 for local processing of the video. The display information 213 may be processed by another device such as a service element 218, whereby the edited video is transmitted to the user device 202, which is discussed in further detail below.

The display information 213 may be generated by a computing device, such as the computing device 204, the service element 218, or a streaming device. The display information 213 may be customized by a computing device. For example, a computing device may be programmed to generate the display information 213 based on particular configurations set for a video. A computing device may be programmed to build upon the display information 213, such as in response to receiving new data or new display parameters.

As another example, a computing device may generate the display information 213 using a machine learning technique. The computing device may receive a sample input, such as particular configurations for one or more videos or metadata, such as a display map or display parameters. The sample input may comprise a learning data set or a training data set, from which the computing device may construct an algorithm or update an existing algorithm to generate new data, such as the display information 213. The computing device may receive a request from the user device 202 for the display information 213. The request may comprise an attribute associated with the recipient device such as screen dimensions and aspect ratio of the recipient device. The computing device may use the algorithm to determine the display information 213 for the user device 202 based on the attribute.

The display information 213 may comprise parameters associated with virtual reality content ("VR content"). VR content may comprise interactive video content. VR content may comprise 360 degree video content. VR content may may comprise one or more view angles. Parameters may comprise frames associated with the one or more view angles. Parameters may comprise boundary parameters associated with the frames or the one or more view angles. Parameters may comprise transition information, such as information related to blending frames when changing view angles.

In an aspect, the computing device 204 may be a server for communicating with the user device 202. As an example, the computing device 204 may manage and/or monitor the intercommunication between the user device 202 and one or more databases 214a, 214b for sending and receiving data therebetween. In an aspect, the databases 214a, 214b may store a plurality of information sets (e.g. data sets, files, web pages, content assets, etc.). As an example, the user device 202 may request an information set from the databases 214a, 214b. As a further example, the user device 202 may retrieve one or more information sets from the databases 214a, 214b, such as content assets 215 and/or the display information 213.

In an aspect, one or more databases may be configured as a content database 214b. The content database 214b may store one or more content assets 215. As an example, one or more content assets 215 may comprise one or more of audio content, video content, news, sports programming, advertisements, and the like. As an example, the content database 214b may be configured to transmit data (e.g., content assets 215) to various end-users. In another aspect, one or more identifiers 216 may be associated with one or more content assets 215. As an example, each content asset 215 may be associated with a unique identifier. As a further example, the identifier 216 may be or comprise a token, a character, a string, or the like, for differentiating one content asset 215 from another content asset 215.

The user device 202 may receive one or more content assets 215. As an example, the user device 202 may be authenticated (e.g., via the authentication element 212) prior to receiving one or more content assets 215. As a further example, the user device 202 may request authentication via the computing device 204 or the like.

The display information 213 may be embedded in a video stream or the content asset 215, or may be comprised in a manifest or sidecar file that the recipient device (e.g., user device 202) may check against based on the current orientation of the recipient device. For example, if the recipient device is in a specific orientation, and if the display information 213 comprises the boundary parameters for video to render for that orientation, then the recipient device may crop the incoming video based on the boundary parameters, which results in display of a specific portion of the overall video scenes. A client side implementation may be implemented, such as by the user device 202, where display information 213 may be embedded in a video stream or the content asset 215, or may be comprised in a manifest or sidecar file that the recipient device (e.g., user device 202) may check against based on the current orientation of the recipient device.

Figure 3:
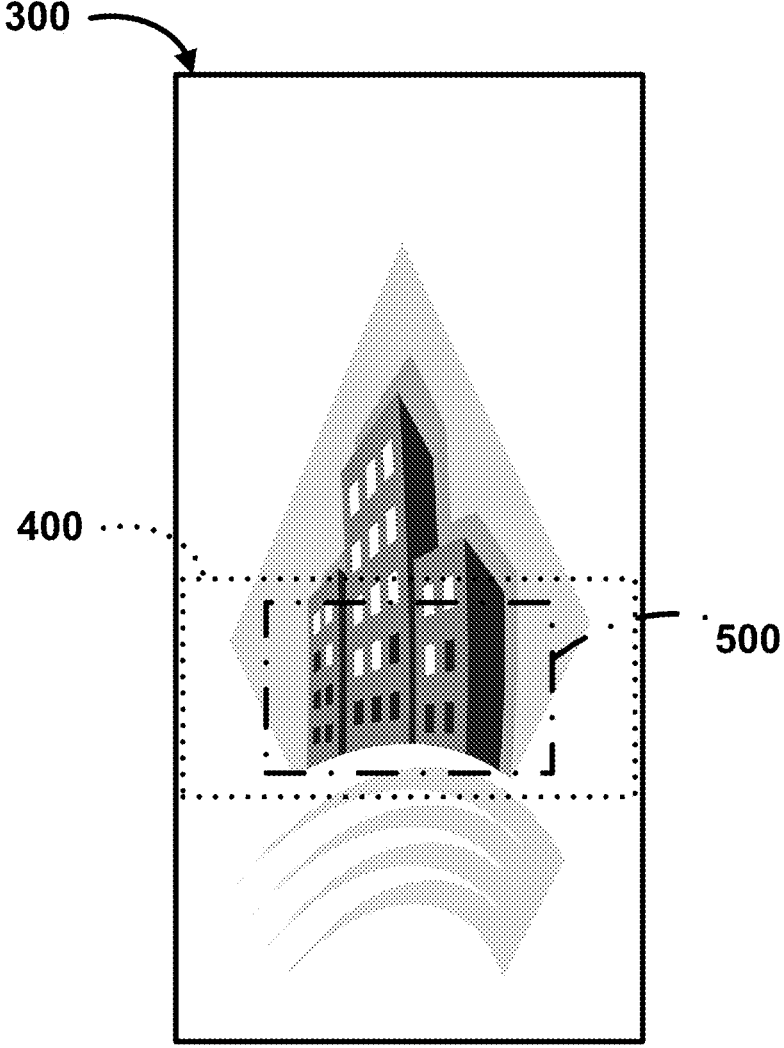
FIG. 3 is a block diagram of example metadata.
Figure 4:
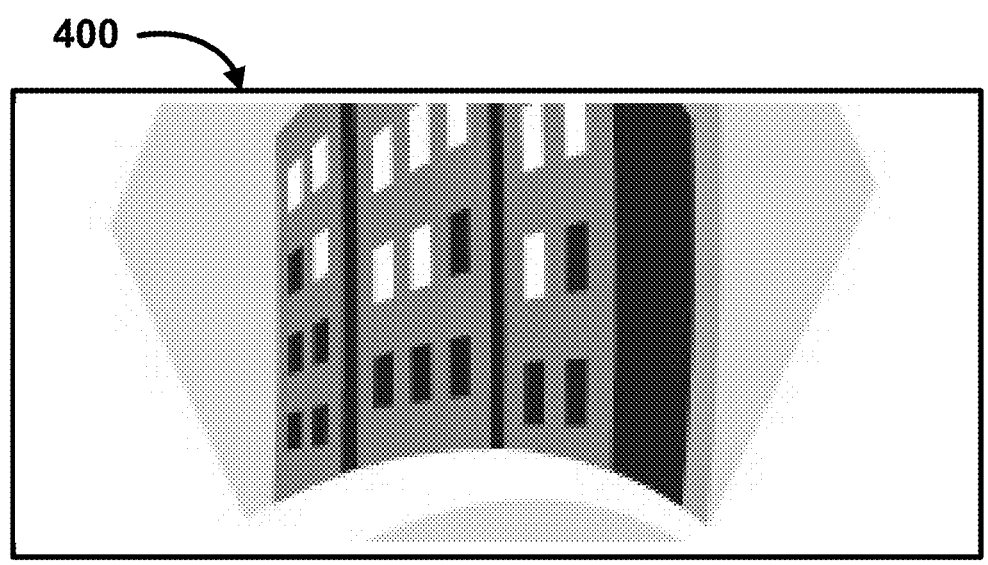
FIG. 4 is a block diagram of a user interface shown in landscape.
Figure 5:
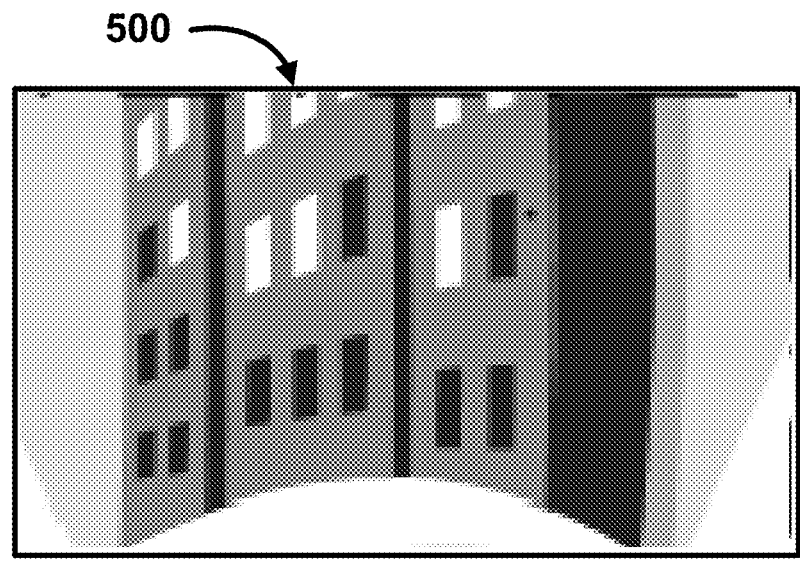
FIG. 5 is a block diagram of a user interface shown in landscape.

A full image 300 or scene of a video may be originally captured with a portrait orientation, as shown in FIG. 3. However, an important portion of the full image 300, such as a focus of the scene or a portion of the scene associated with audio content for the scene, may be only a portion of the over all image area. As such, boundary parameters may be associated with the image for particular devices. As a further example, boundary parameters may define a first image 400 intended for a device having particular device parameters and a second image 500 intended for a device having other device parameters. As shown in FIG. 3, the boundary parameters are established for landscape orientation of the display device. It is understood that any orientation or device parameters may be used to control the display of at least a portion of the full image 300. Accordingly, when a device having receives the video including the full image 300, the recipient device may determine a viewing orientation to be portrait. If the device parameters of the recipient device are compatible with the full image 300, then the full image 300 may be displayed in portrait. Alternatively, the recipient device may determine a viewing orientation to be landscape. Depending on the device parameters of the recipient device, one of the first image and the second image may be displayed. For example, if the device parameters indicate an aspect ratio of 16:9 and a six inch screen size, then the first image 400 may be displayed in landscape, as shown in FIG. 4. However, if the device parameters indicate an aspect ratio of 4:3 and a four inch screen size, then the second image 500 may be displayed in landscape, as shown in FIG. 5. It is understood that the first image 400 and the second image 500 may be an edited (e.g., cropped) version of the full image 300 and not a distinct image. It is further understood that such editing may be executed by the recipient device based on the received display information.

Returning to FIG. 2, the service element 218 may be configured to manage the editing of certain video. As such, the edited video may be transmitted to the user device 202 for normal playback, without additional processing at the user device 202. The user device 202 may receive video such as content asset 215. The user device 202 may request the display parameters (e.g., metadata) from the service element 218 or other service or device. For example, in the IP video context, a recipient device (e.g., user device 202) may generate a request (e.g., an HTTP request) to a video streaming device. The request may comprise attributes associated with the recipient device such as screen dimensions and aspect ratio of the recipient device. The video streaming device may determine metadata based on the attributes associated with the recipient device, crop the video based on the boundary parameters in the metadata, and transmit (e.g., stream) the cropped video to the recipient device. The metadata may be determined based on the request.

Figure 6:
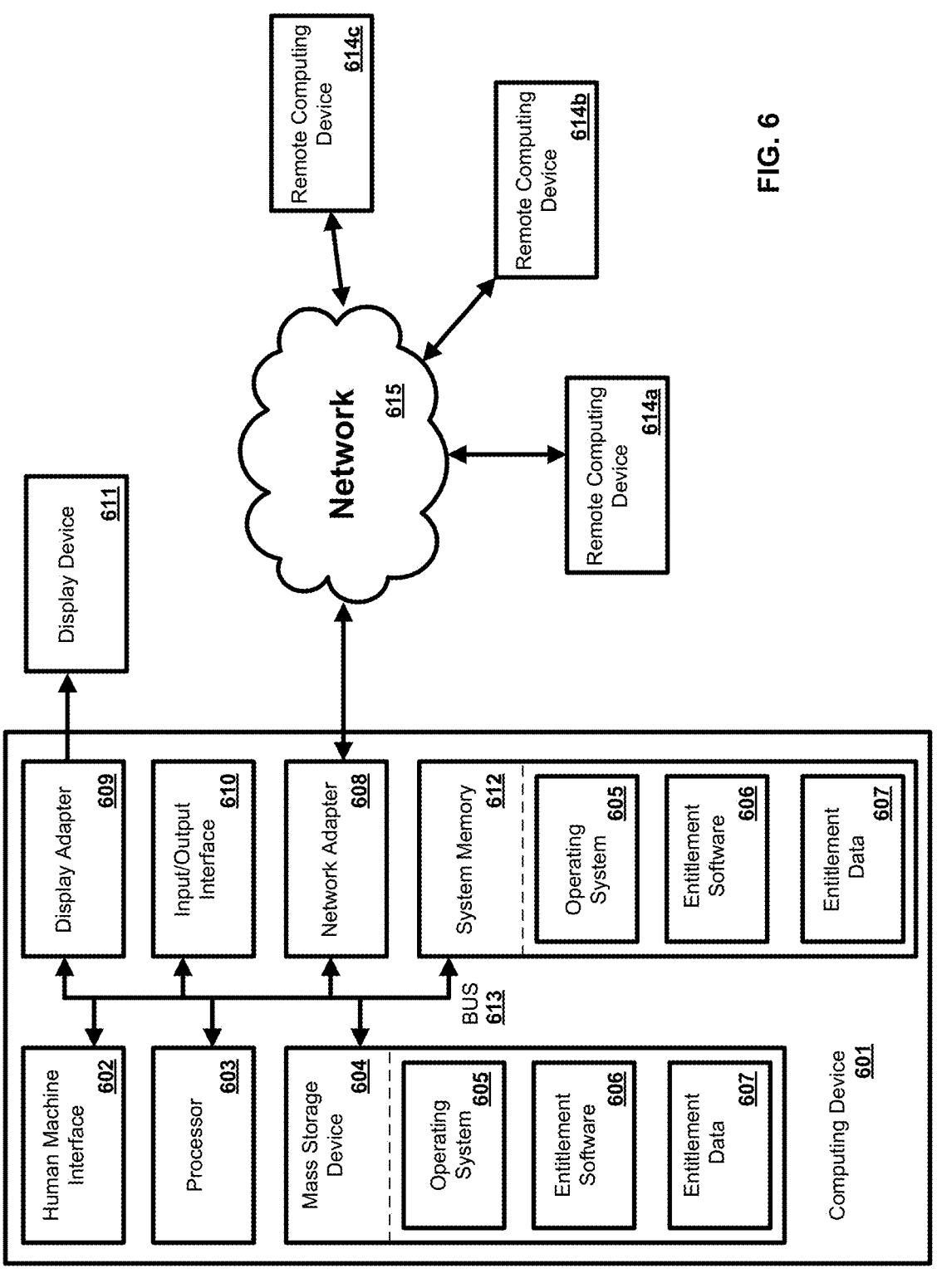
FIG. 6 is a block diagram of an exemplary computing system.

The methods and systems may be implemented on a computing system such as computing device 601 as shown in FIG. 6 and described below. By way of example, one or more of the user device 102 and the computing device 104 of FIG. 1 may be a computer as shown in FIG. 6. Similarly, the methods and systems disclosed may utilize one or more computers to perform one or more functions in one or more locations. FIG. 6 is a block diagram showing an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The methods, systems, and apparatuses described herein may be operational with numerous other general purpose or special purpose computing system environments or configurations. Examples of well-known computing systems, environments, and/or configurations that may be suitable for use with the systems and methods comprise, but are not limited to, personal computers, server computers, laptop devices, and multiprocessor systems. Additional examples comprise set top boxes, programmable consumer electronics, network PCs, minicomputers, and mainframe computers, distributed computing environments that comprise any of the above systems or devices, and the like.

The processing of the disclosed methods and systems may be performed by software components. The disclosed systems and methods may be described in the general context of computer-executable instructions, such as program modules, being executed by one or more computers or other devices. Generally, program modules comprise computer code, routines, programs, objects, components, data structures, etc. that performs particular tasks or implement particular abstract data types. The disclosed methods may also be practiced in grid-based and distributed computing environments where tasks are performed by remote processing devices that are linked through a communications network. In a distributed computing environment, program modules may be located in both local and remote computer storage media including memory storage devices.

Further, one skilled in the art will appreciate that the systems and methods disclosed herein may be implemented via a general-purpose computing device in the form of a computing device 601. The components of the computing device 601 may comprise, but are not limited to, one or more processors or processing units 603, a system memory 612, and a system bus 613 that couples various system components including the processor 603 to the system memory 612. In the case of multiple processing units 603, the system may utilize parallel computing.

The system bus 613 represents one or more of several possible types of bus structures, including a memory bus or memory controller, a peripheral bus, an accelerated graphics port, and a processor or local bus using any of a variety of bus architectures. By way of example, such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses specified in this description may also be implemented over a wired or wireless network connection and each of the subsystems, including the processor 603, a mass storage device 604, an operating system 605, entitlement software 606, entitlement data 607, a network adapter 608, system memory 612, an Input/Output Interface 610, a display adapter 609, a display device 611, and a human machine interface 602, may be contained within one or more remote computing devices 614a,b,c at physically separate locations, connected through buses of this form, in effect implementing a fully distributed system.

The computing device 601 typically comprises a variety of computer readable media. Exemplary readable media may be any available media that is accessible by the computing device 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data such as entitlement data 607 and/or program modules such as operating system 605 and entitlement software 606 that are immediately accessible to and/or are presently operated on by the processing unit 603.

The computing device 601 may also comprise other removable/non-removable, volatile/non-volatile computer storage media. By way of example, FIG. 6 shows a mass storage device 604 which may provide non-volatile storage of computer code, computer readable instructions, data structures, program modules, and other data for the computing device 601. For example and not meant to be limiting, a mass storage device 604 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules may be stored on the mass storage device 604, including by way of example, an operating system 605 and entitlement software 606. Each of the operating system 605 and entitlement software 606 (or some combination thereof) may comprise elements of the programming and the entitlement software 606. Entitlement data 607 may also be stored on the mass storage device 604. Entitlement data 607 may be stored in any of one or more databases known in the art. Examples of such databases comprise, DB2®, Microsoft® Access, Microsoft® SQL Server, Oracle®, mySQL, PostgreSQL, and the like. The databases may be centralized or distributed across multiple systems.

In another aspect, the user may enter commands and information into the computing device 601 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices may be connected to the processing unit 603 via a human machine interface 602 that is coupled to the system bus 613, but may be connected by other interface and bus structures, such as a parallel port, game port, an IEEE 1394 Port (also known as a Firewire port), a serial port, or a universal serial bus (USB).

In yet another aspect, a display device 611 may also be connected to the system bus 613 via an interface, such as a display adapter 609. It is contemplated that the computing device 601 may have more than one display adapter 609 and the computer 601 may have more than one display device 611. For example, a display device may be a monitor, an LCD (Liquid Crystal Display), or a projector. In addition to the display device 611, other output peripheral devices may comprise components such as speakers (not shown) and a printer (not shown) which may be connected to the computing device 601 via Input/Output Interface 610. Any step and/or result of the methods may be output in any form to an output device. Such output may be any form of visual representation, including, but not limited to, textual, graphical, animation, audio, tactile, and the like. The display 611 and computing device 601 may be part of one device, or separate devices.

The computing device 601 may operate in a networked environment using logical connections to one or more remote computing devices 614a,b,c. By way of example, a remote computing device may be a personal computer, portable computer, a smart phone, a server, a router, a network computer, a peer device or other common network node, and so on. Logical connections between the computing device 601 and a remote computing device 614a,b,c may be made via a network 615, such as a local area network (LAN) and a general wide area network (WAN). Such network connections may be through a network adapter 608. A network adapter 608 may be implemented in both wired and wireless environments. Such networking environments are conventional and commonplace in dwellings, offices, enterprise-wide computer networks, intranets, and the Internet.

For purposes of illustration, application programs and other executable program components such as the operating system 605 are shown herein as discrete blocks, although it is recognized that such programs and components reside at various times in different storage components of the computing device 601, and are executed by the data processor(s) of the computer. An implementation of entitlement software 606 may be stored on or transmitted across some form of computer readable media. Any of the disclosed methods may be performed by computer readable instructions embodied on computer readable media. Computer readable media may be any available media that may be accessed by a computer. By way of example and not meant to be limiting, computer readable media may comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

The methods and systems may employ artificial intelligence (AI) techniques such as machine learning and iterative learning. Examples of such techniques comprise, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

For example, the methods and systems may employ AI techniques to generate metadata, such as a display map or display parameters. The systems and methods may employ AI techniques to set particular configurations for a video. AI techniques may be used to identify a focus of a frame or scene and to determine boundary parameters for the frame or scene that comprise the focus.

Using AI techniques, for example, a computing device may recognize the appearance of dialogue in a scene. The computing device may recognize mouth movement and match the mouth movement to audio content corresponding to the scene. The computing device may determine boundary parameters for the scene or for frames of the scene featuring the mouth movement.

Figure 7:
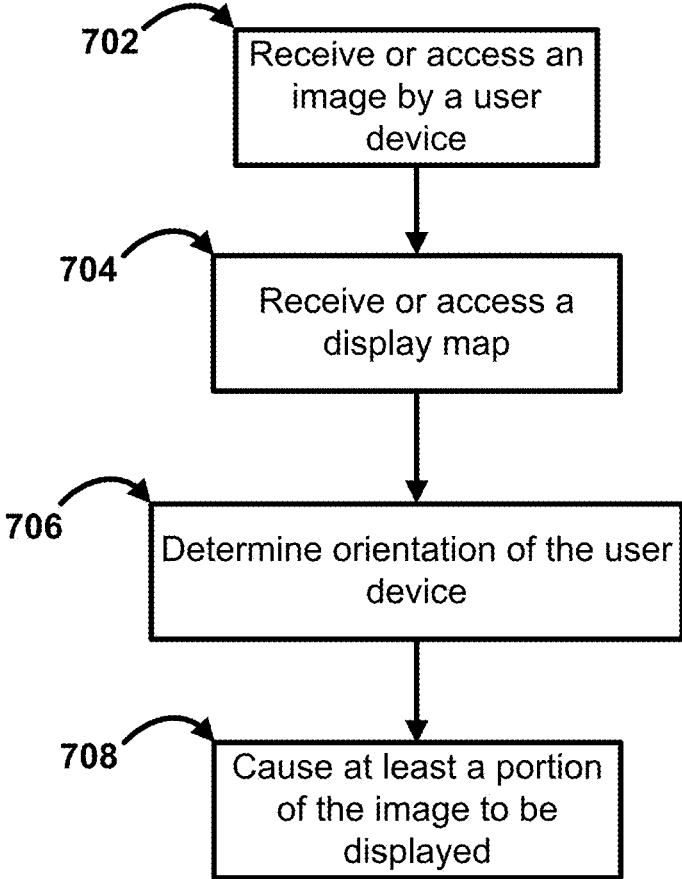
FIG. 7 is a flow chart of an exemplary method.

As shown in FIG. 7, a method may comprise receiving or accessing an image, such as an image of a video, at step 702. A user device may receive or access the image. The image may comprise a frame of a video. The device may receive or access a file comprising the image. The device may receive or access a stream of data comprising the image, such as from a server. The image may be configured for display by the device receiving the image.

At step 704, a display map may be accessed or received. The display map may be accessed or received by the user device. The display map may be accessed or received by a computing device, such as a server, the computing device 204, or the service element 218 in FIG. 2. The display map may be accessed or received from a database, such as the database 214a or the content database 214b in FIG. 2. The display map may be imbedded in the image or the video. The display map may be comprised in a manifest or sidecar file associated with the image or the video.

The display map may indicate display parameters for configuring the display of the image based on an orientation of the user device. The display map may comprise a plurality of mapped groups, each of the mapped groups corresponding to a particular orientation of the user device and an associated set of display parameters. The display parameters may comprise one or more of an image boundary, an aspect ratio, and a transition. The display parameters may comprise a first image boundary associated with a portrait orientation of the user device and a second image boundary associated with a landscape orientation of the user device. The first image boundary may represent a portion of the image that is less than the whole image. The second image boundary may represent a portion of the image that is less than the whole image.

At step 706, an orientation of the device receiving the image may be determined. Such determination may comprise receiving orientation data from a sensor integrated with the user device. The sensor may comprise an inertia sensor, a gyroscope, an accelerometer, a different motion sensor, or a combination thereof. The orientation data may comprise a position of the device. The position of the device may be defined with respect to an axis, such an axis normal to the surface of the Earth. The position of the device may be defined as a deviation from an axis. The orientation data may comprise a movement of the device, such as a tilt or rotation of the device. The movement of the device may be defined with respect to an axis such as a pitch axis, a yaw axis, or a roll axis.

At step 708, at least a portion of the image may be caused to be displayed by the user device based at least on the display map and the determined orientation of the user device. The user device may cause the at least portion of the image to be displayed. A streaming device or a server may cause the at least portion of the image to be displayed. For example, a server may crop the image to comprise the portion defined by the image boundary. The server may transmit the cropped image to the user device.

A user may wish to watch a movie on a tablet device. The movie may be hosted by a streaming service, such as XFINITY TV. The user may select the movie via an application on the tablet that accesses an on-demand library, such as the XFINITY Stream app. A computing device, such as the computing device 204 or the service element 218 in FIG. 2 may receive the user's movie selection. The computing device may access the selected movie, such as from a database (e.g., database 214a, content database 214b in FIG. 2).

The computing device may access a display map associated with the selected movie. The computing device may access the display map from a database. The display map may be embedded in the movie. The display map may be comprised in a manifest or sidecar file. The display map may comprise boundary parameters corresponding to different timecodes of the movie. The boundary parameters may comprise coordinates of a frame or scene of the movie that have been determined to comprise a focus of the frame or the scene in the movie for the corresponding timeframe. The boundary parameters may be mapped to orientations and device parameters, such as device aspect ratio.

The computing device may identify a 4:3 aspect ratio of the tablet device. The computing device may determine that the tablet device is held in a portrait orientation. The computing device may stream the movie to the tablet device according to the display parameters corresponding to 4:3 aspect ratio and a portrait orientation. The computing device may stream frames or scenes of the movie that are cut to comprise portions defined by the boundary parameters to display the focus of the frames or scenes. The computing device may transition between frames corresponding timecodes of the movie according to transition information in the display map. For example, the computing device may create a blur effect when transitioning between frames using an image processing technique.

The user may recline on her side, still holding the tablet in front of her eyes. As the user moves from an upright to a reclined position, the computing device may determine the orientations of the tablet from a sensor in the tablet. The computing device may apply display parameters of the display map that correspond to 4:3 aspect ratio and orientation at each angle that the tablet passes through as the user changes position. The computing device may cause frames to render on the tablet that are cut according to boundary parameters of the display parameters.

From the user's perspective, the orientation of the movie relative the tablet display may not change as the user reclines. No voids may appear on the tablet display and the movie may fill the display. The image on the display may comprise a portion of the original frame of the movie, but the focus of the frame appears on the tablet display.

Figure 8:
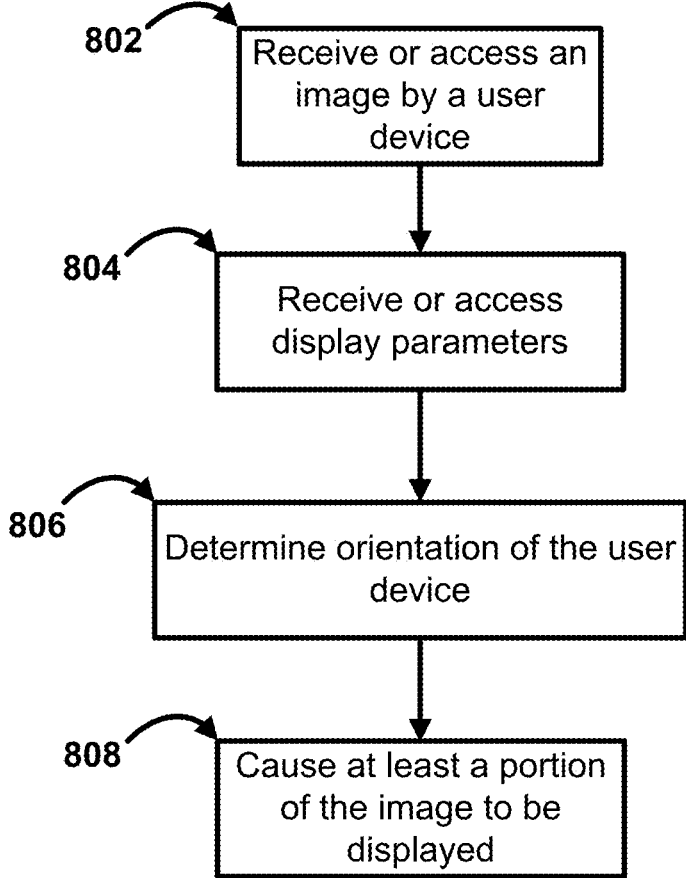
FIG. 8 is a flow chart of an exemplary method.

FIG. 8 shows an exemplary method for controlling display of a video. At step 802, an image, such as an image of a video, may be received or accessed. A computing device, such as a server, the computing device 204, or the service element 218 in FIG. 2. may receive or access the image. The computing device may receive or access a file comprising the image. The image may comprise a frame of a video. The image may be configured for display by the device receiving the image. The accessing or receiving the image may be in response to a request. The request may be received from a user device. The request may comprise attributes associated with the user device, such as dimensions or aspect ratio of a display of the user device.

At step 804, display parameters may be accessed or received. The display parameters may be accessed or received by a computing device. The display parameters may be accessed or received from a database, such as the database 214a or the content database 214b in FIG. 2. The display parameters may be imbedded in the image or the video. The display parameters may be comprised in a manifest or sidecar file associated with the image or the video.

The display parameters may comprise information for configuring the display of the image based on an orientation of the user device. The display parameters may comprise one or more of an image boundary, an aspect ratio, and a transition. The display parameters may comprise a first image boundary associated with a portrait orientation of the user device and a second image boundary associated with a landscape orientation of the user device. The first image boundary may represent a portion of the image that is less than the whole image. The second image boundary may represent a portion of the image that is less than the whole image.

At step 806, an orientation of the device receiving the image may be determined. The orientation may comprise binary information such as portrait or landscape. Orientation may comprise any representation of viewing perspective of the device or of a display of the device. Orientation may comprise a viewing perspective offset from a portrait or a landscape perspective, such as by an angle. The orientation may comprise a position of the device. The position of the device may be defined with respect to an axis, such an axis normal to the surface of the Earth. The position of the device may be defined as a deviation from an axis. The orientation may comprise a movement of the device, such as a tilt or rotation of the device. The movement of the device may be defined with respect to an axis such as a pitch axis, a yaw axis, or a roll axis.

Such determination may comprise receiving orientation data from a sensor integrated with the user device. The sensor may comprise an inertia sensor, a gyroscope, an accelerometer, a different motion sensor, or a combination thereof.

At step 808, at least a portion of the image may be caused to be displayed by the user device based at least on the display map and the determined orientation of the user device. A streaming device or a server may cause the at least portion of the image to be displayed. The user device may cause the at least portion of the image to be displayed. For example, the user device may be display a cropped image comprising the portion defined by the image boundary.

A user may download a video game on a handheld video game system. The video game file may comprise display parameters. The handheld system may identify the display parameters corresponding to an aspect ratio of the handheld system display. The display parameters may comprise image boundaries and timecodes. The timecodes may correspond to frames at different periods throughout the game. The user may initiate the game. The handheld system may detect an orientation of the system using a sensor in the system. The handheld system may identify image boundaries associated with the aspect ratio and the current orientation of the system. The handheld system may cause portions of the frames cut according to image boundaries to render via the display. The handheld system may apply different image boundaries as the user progresses through the game and periods corresponding to different timecodes.

Figure 9:
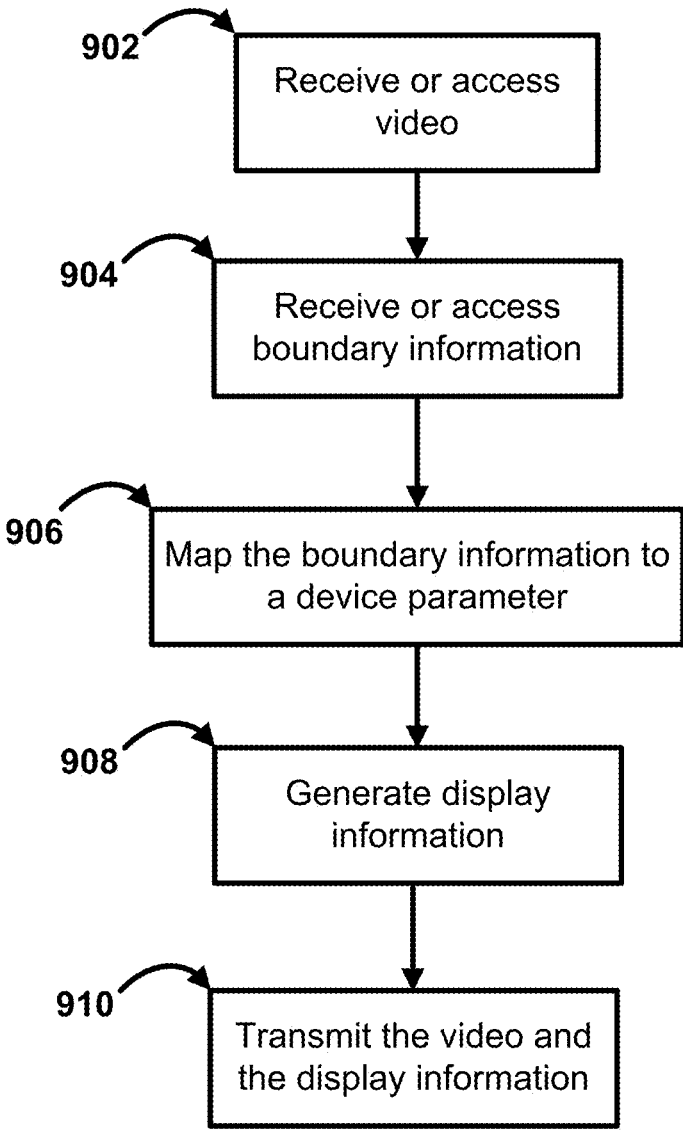
FIG. 9 is a flow chart of an exemplary method.

FIG. 9 shows an exemplary method for controlling playback of a video. In step 902, a video may be received or accessed. The video may be received or accessed by a user device. The video may be received or accessed by a computing device, such as a server, the computing device 204, or the service element 218 in FIG. 2. The computing device may receive or access a file comprising the video. The video may be configured for display by the device receiving the image. The accessing or receiving the video may be in response to a request. The request may be received from a user device. The request may comprise attributes associated with the user device, such as dimensions or aspect ratio of a display of the user device.

The video may have at least one time stamp associated with at least one scene. The time stamp may comprise a timecode. A timecode may comprise timing information associated with the scene. For example, the timecode may comprise a start time and an end time of the scene. The timecodes may indicate a display parameter to be applied at the scene.

At step 904, boundary information may be received or accessed. The boundary information may be received or accessed by a computing device. The boundary information may be received or accessed from a database, such as the database 214*a* or the content database 214*b* in FIG. 2. The boundary information may be received or accessed in response to a request, such as a request by a user device. The boundary information may comprise a configuration set for the video, such as by a source of the video. The boundary information may be associated with the time stamp. The boundary information may be associated with a portion of the scene for display during playback.

At step 906, the boundary information may be mapped (e.g., associated) to at least one set of device parameters. The device parameters may comprise orientation of the device, aspect ratio, screen size, and the like. The boundary information may be mapped to at least one set of device parameters by a computing device. For example, a computing device may be programmed to generate the boundary parameters for particular device parameters, such as based on particular configurations set for a video.

The computing device may map the device parameters to the boundary parameters using a machine learning technique. For example, the computing device may receive a sample input, such as sample boundary information and sample device parameters. The computing device may use the sample input to construct an algorithm or update an existing algorithm to map boundary parameters to a plurality of device parameters.

At step 908, display information (e.g., a display map) may be generated. The display information may be generated by a computing device, such as with a program or a machine learning technique. The display information may comprise the mapping of the boundary information and the at least one set of device parameters. The display information may comprise a plurality of mapped groups, each of the mapped groups corresponding to a particular orientation of a user device and an associated set of display parameters. The display parameters may comprise one or more of an image boundary, an aspect ratio, and a transition. The display parameters may comprise a first image boundary associated with a portrait orientation of the user device and a second image boundary associated with a landscape orientation of the user device. The first image boundary may represent a portion of the image that is less than the whole image. The second image boundary may represent a portion of the image that is less than the whole image.

At step 910, the video and the display information may be transmitted, for example, to a device for display of the video. As such, the display information may facilitate the playback of the portion of the scene of the video associated with the timestamp. For example, the display information may facilitate the playback of the portion of the scene of the video associated with the timestamp on a user device. The display information may facilitate the playback of the portion of the scene of the video according to device parameters, such as device parameters of a user device, mapped to boundary parameters.

As an example, a timestamp 02:34:15-04:23:03 of a video may correspond to a scene in the video that starts 2 hours, 34 minutes, and 15 seconds into the video and ends 4 hours, 23 minutes, and 3 seconds into the video. The scene may feature footage of two people engaged in a sword fight beside a horse and a carriage. The sword fight may be identified as the focus of the scene.

Boundary information associated with the timestamp 02:34:15-04:23:03 may comprise $(X_1=6, Y_1=0)(X_2=12, Y_2=8)$ for a portrait orientation. Boundary information associated with the timestamp 02:34:15-04:23:03 may comprise $(X_1=4, Y_1=0)(X_2=12, Y_2=7)$ for a landscape orientation. The boundary information may comprise coordinates of vertices of a diagonal of a portion of an original frame with a dimension of $X=12, Y=8$. The boundary information may define a portion of the original frame in which the sword fight appears but the region $X=0-4$ in which the horse and the carriage are cropped out of the scene. Display information for the scene may be generated by mapping the boundary information for the scene for an oval-shaped display. Display information for the scene may be generated by mapping the boundary information for the scene for an oval-shaped display in a landscape orientation and in a vertical orientation.

The video and the display information may be transmitted to a smart watch with an oval face comprising a display. The display information corresponding to the present orientation of the smart watch display may be applied to the video and the scene may be rendered via the display of the smart watch. When the smart watch is in a landscape orientation, a portion of the scene featuring the sword fight and the horse and carriage may appear on the display of the smart watch. However, if the smart watch is rotated to a portrait orientation, a portion of the scene featuring the sword fight but not the horse and carriage may appear on the display of the smart watch.

As used in the specification and the appended claims, the singular forms "a," "an" and "the" comprise plural referents unless the context clearly dictates otherwise. Ranges may be expressed herein as from "about" one particular value, and/or to "about" another particular value. When such a range is expressed, another embodiment comprises from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description comprises instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that may be performed it is understood that each of these additional steps may be performed with any specific embodiment or combination of embodiments of the disclosed methods.

The present methods and systems may be understood more readily by reference to the following detailed description of preferred embodiments and the examples comprised therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, may be implemented by special purpose hardware-based computer systems that perform the specified functions or steps, or combinations of special purpose hardware and computer instructions.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations may be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A device comprising:
one or more processors; and
memory storing instructions that, when executed by the one or more processors, cause the device to:
  receive an image configured for output by the device;
  receive output information associated with the image, wherein the output information comprises a first plurality of output parameters associated with a first orientation of the device, and a second plurality of output parameters associated with a second orientation of the device;
  determine the first orientation of the device; and
  cause, based on determining the first orientation, and based on the first plurality of output parameters associated with the first orientation, at least a portion of the image to be output by the device.

2. The device of claim 1, wherein the image is associated with a portion of a video.

3. The device of claim 1, wherein the output information comprises a display map indicating the first plurality of output parameters and the second plurality of output parameters.

4. The device of claim 1, wherein the first plurality of output parameters and the second plurality of output parameters each comprise at least one of: an image boundary, an aspect ratio, one or more image boundaries, or a transition.

5. The device of claim 1, wherein the determining the first orientation of the device comprises receiving orientation data from a sensor integrated with the device.

6. The device of claim 1, wherein the first plurality of output parameters comprises a first image boundary associated with a portrait orientation of the device, and the second plurality of output parameters comprises a second image boundary associated with a landscape orientation of the device.

7. The device of claim 6, wherein the first image boundary or the second image boundary represents a portion of the image that is less than the whole image.

8. The device of claim 3, wherein the receiving the output information comprises receiving the output information in response to a request for information relating to the video.

9. A non-transitory computer-readable medium storing instructions that, when executed, cause:
receiving, by a user device, an image configured for output by the user device;
receiving output information associated with the image, wherein the output information comprises a first plurality of output parameters associated with a first orientation of the user device, and a second plurality of output parameters associated with a second orientation of the user device;
determining the first orientation of the user device; and
causing, based on determining the first orientation, and based on the first plurality of output parameters associated with the first orientation, at least a portion of the image to be output by the user device.

10. The non-transitory computer-readable medium of claim 9, wherein the image is associated with a portion of a video.

11. The non-transitory computer-readable medium of claim 9, wherein the output information comprises a display map indicating the first plurality of output parameters and the second plurality of output parameters.

12. The non-transitory computer-readable medium of claim 9, wherein the first plurality of output parameters and the second plurality of output parameters each comprise at least one of: an image boundary, an aspect ratio, one or more image boundaries, or a transition.

13. The non-transitory computer-readable medium of claim 9, wherein the determining the first orientation of the user device comprises receiving orientation data from a sensor integrated with the user device.

14. The non-transitory computer-readable medium of claim 9, wherein the first plurality of output parameters comprises a first image boundary associated with a portrait orientation of the user device, and the second plurality of output parameters comprises a second image boundary associated with a landscape orientation of the user device.

15. The non-transitory computer-readable medium of claim 14, wherein the first image boundary or the second image boundary represents a portion of the image that is less than the whole image.

16. The non-transitory computer-readable medium of claim 11, wherein the receiving the output information comprises receiving the output information in response to a request for information relating to the video.

17. A system comprising:
a first computing device configured to:
  receive an image configured for output by the first computing device,
  receive output information associated with the image, wherein the output information comprises a first plurality of output parameters associated with a first orientation of the first computing device, and a second plurality of output parameters associated with a second orientation of the first computing device,
  determine the first orientation of the first computing device, and
  cause, based on determining the first orientation, and based on the first plurality of output parameters associated with the first orientation, at least a portion of the image to be output by the first computing device; and a second computing device configured to:

send the output information associated with the image.

18. The system of claim 17, wherein the image is associated with a portion of a video.

19. The system of claim 17, wherein the output information comprises a display map indicating the first plurality of output parameters and the second plurality of output parameters.

20. The system of claim 17, wherein the first plurality of output parameters and the second plurality of output parameters each comprise at least one of: an image boundary, an aspect ratio, one or more image boundaries, or a transition.

21. The system of claim 17, wherein the determining the first orientation of the first computing device comprises receiving orientation data from a sensor integrated with the first computing device.

22. The system of claim 17, wherein the first plurality of output parameters comprises a first image boundary associated with a portrait orientation of the first computing device, and the second plurality of output parameters comprises a second image boundary associated with a landscape orientation of the first computing device.

23. The system of claim 22, wherein the first image boundary or the second image boundary represents a portion of the image that is less than the whole image.

24. The system of claim 19, wherein the receiving the output information comprises receiving the output information in response to a request for information relating to the video.

25. A device comprising:

one or more processors; and memory storing instructions that, when executed by the one or more processors, cause the device to:

receive an image and output information, wherein the output information comprises a first plurality of output parameters associated with a first orientation of the device, and a second plurality of output parameters associated with a second orientation of the device;

determine the first orientation of the device; and cause, based on determining the first orientation, and based on the first plurality of output parameters associated with the first orientation, at least a portion of the image to be output by the device.

26. The device of claim 25, wherein the image is associated with a portion of a video.

27. The device of claim 26, wherein the receiving the output information is in response to a request for information relating to the video.

28. The device of claim 25, wherein the first plurality of output parameters and the second plurality of output parameters each comprise at least one of:

an image boundary, an aspect ratio, one or more image boundaries, or a transition.

29. The device of claim 25, wherein the determining the first orientation of the device comprises receiving orientation data from a sensor integrated with the device.

30. The device of claim 25, wherein the first plurality of output parameters comprises a first image boundary associated with a portrait orientation of the device, and the second plurality of output parameters comprises a second image boundary associated with a landscape orientation of the device.

31. The device of claim 30, wherein the first image boundary or the second image boundary represents a portion of the image that is less than the whole image.

32. The device of claim 25, wherein the output information comprises a display map indicating the first plurality of output parameters and the second plurality of output parameters.

33. A non-transitory computer-readable medium storing instructions that, when executed, cause:

receiving, by a user device, an image and output information, wherein the output information comprises a first plurality of output parameters associated with a first orientation of the user device, and a second plurality of output parameters associated with a second orientation of the user device;

determining the first orientation of the user device; and causing, based on determining the first orientation, and based on the first plurality of output parameters associated with the first orientation, at least a portion of the image to be output by the user device.

34. The non-transitory computer-readable medium of claim 33, wherein the image is associated with a portion of a video.

35. The non-transitory computer-readable medium of claim 34, wherein the receiving the output information is in response to a request for information relating to the video.

36. The non-transitory computer-readable medium of claim 33, wherein the first plurality of output parameters and the second plurality of output parameters each comprise at least one of:

an image boundary, an aspect ratio, one or more image boundaries, or a transition.

37. The non-transitory computer-readable medium of claim 33, wherein the determining the first orientation of the user device comprises receiving orientation data from a sensor integrated with the user device.

38. The non-transitory computer-readable medium of claim 33, wherein the first plurality of output parameters comprises a first image boundary associated with a portrait orientation of the user device, and the second plurality of output parameters comprises a second image boundary associated with a landscape orientation of the user device.

39. The non-transitory computer-readable medium of claim 38, wherein the first image boundary or the second image boundary represents a portion of the image that is less than the whole image.

40. The non-transitory computer-readable medium of claim 33, wherein the output information comprises a display map indicating the first plurality of output parameters and the second plurality of output parameters.

41. A system comprising:

a first computing device configured to:

receive an image and output information, wherein the output information comprises a first plurality of output parameters associated with a first orientation of the first computing device, and a second plurality of output parameters associated with a second orientation of the first computing device;

determine the first orientation of the first computing device; and cause, based on determining the first orientation, and based on the first plurality of output parameters associated with the first orientation, at least a portion of the image to be output by the first computing device; and a second computing device configured to:

send the image and the output information.

42. The system of claim 41, wherein the image is associated with a portion of a video.

43. The system of claim 42, wherein the receiving the output information is in response to a request for information relating to the video.

44. The system of claim 41, wherein the first plurality of output parameters and the second plurality of output parameters each comprise at least one of: an image boundary, an aspect ratio, one or more image boundaries, or a transition.

45. The system of claim 41, wherein the determining the first orientation of the first computing device comprises receiving orientation data from a sensor integrated with the first computing device.

46. The system of claim 41, wherein the first plurality of output parameters comprises a first image boundary associated with a portrait orientation of the first computing device, and the second plurality of output parameters comprises a second image boundary associated with a landscape orientation of the first computing device.

47. The system of claim 46, wherein the first image boundary or the second image boundary represents a portion of the image that is less than the whole image.

48. The system of claim 41, wherein the output information comprises a display map indicating the first plurality of output parameters and the second plurality of output parameters.

\* \* \* \* \*